United States Patent
Liu et al.

(10) Patent No.: US 7,102,821 B1
(45) Date of Patent: Sep. 5, 2006

(54) APPARATUS AND SYSTEM FOR A RE-CONFIGURABLE CHANNEL DROPPING DE-MULTIPLEXER

(75) Inventors: Yongsheng Liu, San Jose, CA (US); Giovanni Barbarossa, Saratoga, CA (US)

(73) Assignee: Avonex Corporation, Fremont, CA (US)

( * ) Notice: Subject to any disclaimer, the term of this patent is extended or adjusted under 35 U.S.C. 154(b) by 214 days.

(21) Appl. No.: 10/661,452

(22) Filed: Sep. 12, 2003

(51) Int. Cl.
*G02B 27/28* (2006.01)
*G02B 5/30* (2006.01)

(52) U.S. Cl. .................. 359/496; 359/494; 359/495; 359/485; 385/11; 385/24

(58) Field of Classification Search ........ 359/494–498, 359/483–485; 385/11, 24, 17
See application file for complete search history.

(56) References Cited

U.S. PATENT DOCUMENTS

| | | | |
|---|---|---|---|
| 5,930,028 A * | 7/1999 | Bergmann | 359/303 |
| 6,134,358 A * | 10/2000 | Wu et al. | 385/16 |
| 6,259,834 B1 * | 7/2001 | Shani | 385/17 |
| 6,493,141 B1 * | 12/2002 | Cao et al. | 359/497 |
| 6,687,423 B1 * | 2/2004 | Yao | 385/11 |
| 2004/0184696 A1 * | 9/2004 | Miao et al. | 385/11 |
| 2005/0030623 A1 * | 2/2005 | Koh | 359/484 |

* cited by examiner

Primary Examiner—Leonidas Boutsikaris
Assistant Examiner—Craig Curtis
(74) Attorney, Agent, or Firm—Patterson & Sheridan, LLP

(57) ABSTRACT

An improved apparatus and system for a re-configurable optical channel dropping de-multiplexer is herein disclosed. A re-configurable channel dropping de-multiplexer in accordance with the present invention comprises an input, a first polarizing port optically coupled to the input, a first polarization modulator optically coupled to the first polarizing port, a polarization beam splitter (PBS) having a first side that is optically coupled to the first polarization modulator at a side opposite to the first polarizing port, a second polarization modulator optically coupled to the PBS at a second side of the PBS that is opposite to the first side, a second polarizing port optically coupled to the second polarization modulator at a side opposite to the PBS and a multiple-channel output optically coupled to the second polarizing port.

18 Claims, 10 Drawing Sheets

APPARATUS AND SYSTEM FOR A RE-CONFIGURABLE CHANNEL DROPPING DE-MULTIPLEXER

FIELD OF THE INVENTION

The present invention relates to re-configurable optical channel dropping de-multiplexers utilized in optical communications systems. More particularly, the present invention relates to a re-configurable optical channel dropping de-multiplexer wherein a single wavelength channel from among a plurality of channels comprising a wavelength division multiplexed composite optical signal may be delivered to a desired drop port.

BACKGROUND OF THE INVENTION

Optical fibers are used extensively in telecommunications systems. In this document, the term "optical" is not limited to references to visible radiation but is used in a broad sense to refer to electromagnetic radiation of any wavelength or wavelengths that may carry an information signal and that may be propagated along or through a waveguide device so as to deliver the information signal from one location to another location. It is often necessary to add or drop a wavelength channel in optical links or systems. Channel dropping can be achieved by a re-configurable channel dropping de-multiplexer. Such a re-configurable channel dropping de-multiplexer receives, from an input port, a wavelength division multiplexed composite optical signal that comprises several channels, or "wavelengths". These plural channels include one or more "dropped channels" or wavelengths that a user wishes to remove, or "drop" to selected local channel drop ports, and, optionally, other "express" channels that the user wishes to send, as a wavelength division multiplexed composite optical signal, to another destination. The re-configurable channel dropping de-multiplexer permits the user to choose whether to drop or not to drop one or more pre-determined channels.

FIG. 7 illustrates a conventional single-dropped-channel re-configurable channel dropping de-multiplexer. The conventional single-dropped-channel re-configurable channel dropping de-multiplexer 700 comprises an optical input 702, a de-multiplexer 704 optically coupled to the optical input 702, a plurality of single-channel outputs 705.1, 705.2, . . . , 705.$n$ optically coupled to the de-multiplexer 704, an optical switch 706 optically coupled to a first one 705.1 of the plurality of single-channel outputs, two switch outputs 707$a$–707$b$ optically coupled to the optical switch 706, a multiplexer 708 optically coupled to the single-channel outputs 705.2, . . . , 705.$n$ and to the first switch output 707$a$ and an optical output 710 optically coupled to the multiplexer 708.

In the operation of the conventional single-dropped-channel re-configurable channel dropping de-multiplexer 700, a wavelength-division-multiplexed signal comprising the several wavelength channels $\lambda_1$–$\lambda_n$ is delivered from the optical input 702 to the de-multiplexer 704. The de-multiplexer 704 separates the channels so that each channel is directed to a respective one of the single-channel outputs 705.1, 705.2, . . . , 705.$n$. For instance, the channel $\lambda_1$ is output to the first single-channel output 705.1, the channel $\lambda_2$ is output to the second single-channel output 705.2, etc. Each one of the second through the $n^{th}$ single-channel outputs is optically coupled to the multiplexer 708 and delivers a respective optical channel to the multiplexer 708. The first single-channel output 705.1 delivers the channel $\lambda_1$ to the input of the optical switch 706, whereat the channel $\lambda_1$ may be directed to either one of the two switch outputs 707$a$–707$b$, depending upon the controlled operational state of the switch 706. If the channel $\lambda_1$ is directed to the switch output 707$b$, then the channel $\lambda_1$ is removed or "dropped" and the remaining channels $\lambda_2$–$\lambda_n$ are multiplexed by the multiplexer 708 so that the combined wavelength-division-multiplexed signal $\lambda_2$–$\lambda_n$ is output at the optical output 710. If, on the other hand, the channel $\lambda_1$ is directed to the switch output 707$a$, then all of the channels $\lambda_1$–$\lambda_n$ are multiplexed by the multiplexer 708 so that the combined wavelength-division-multiplexed signal $\lambda_1$–$\lambda_n$ is output at the optical output 710.

Although the conventional single-dropped-channel re-configurable channel dropping de-multiplexer 700 can perform its intended function adequately, its use may lead to some disadvantages. A first disadvantage arises from the fact that all channels must be de-multiplexed and the re-multiplexed during operation of the conventional single-dropped-channel re-configurable channel dropping de-multiplexer, regardless of whether the channel $\lambda_1$ is dropped or not. This causes un-necessary optical insertion loss for each channel as compared to an apparatus that does not perform the sequential de-multiplexing and multiplexing steps. Further, during this operation, each channel must pass through both a de-multiplexer and a multiplexer in sequence, the requirements for which add additional bulk, complexity and cost to the conventional apparatus as compared to an apparatus that does not perform the sequential de-multiplexing and multiplexing steps. Accordingly, there is a need in the art for an improved re-configurable channel dropping de-multiplexer. The improved re-configurable channel dropping de-multiplexer should be capable of delivering the non-dropped channels to the output without de-multiplexing and re-multiplexing these channels.

SUMMARY OF THE INVENTION

To address the above-mentioned need in the art, an improved apparatus and system for a re-configurable optical channel dropping de-multiplexer is herein disclosed. An exemplary preferred embodiment of a re-configurable channel dropping de-multiplexer in accordance with the present invention comprises an input, a first polarizing port optically coupled to the input, a first polarization modulator optically coupled to the first polarizing port, a polarization beam splitter (PBS) having a first side that is optically coupled to the first polarization modulator at a side opposite to the first polarizing port, a second polarization modulator optically coupled to the PBS at a second side of the PBS that is opposite to the first side, a second polarizing port optically coupled to the second polarization modulator at a side opposite to the PBS and a multiple-channel output optically coupled to the second polarizing port. Said exemplary embodiment further comprises a first quarter-wave ($\lambda/4$) plate optically coupled to the PBS at a third side of the PBS that is not parallel to either of the first two sides, a second $\lambda/4$ plate optically coupled to the PBS at a fourth side of the PBS that is opposite to the third side and a mirror optically coupled to the second $\lambda/4$ plate at a side opposite to the PBS. Said exemplary embodiment still further comprises an optical channel band pass filter optically coupled to the first $\lambda/4$ plate at a side opposite to the PBS, a third $\lambda/4$ plate optically coupled to the optical channel band pass filter at a side opposite to the first $\lambda/4$ plate, a third polarizing port optically coupled to the third $\lambda/4$ plate at a side opposite to the optical channel band pass filter and a single-channel output optically coupled to the third polarizing port.

In a first operational state of the exemplary preferred embodiment of a re-configurable channel dropping de-multiplexer in accordance with the present invention, both the first and the second polarization modulators are configured so as to rotate the orientation of plane polarized light by 90 degrees. In this first operational state, a plurality of optical channels received from the input are directed to both the second polarizing port and the third polarizing port such that a single dropped channel is routed to the third polarizing port and such that the remaining express channels are routed to the second polarizing port. In a second operational state of the exemplary preferred embodiment of a re-configurable channel dropping de-multiplexer in accordance with the present invention, both the first and the second polarization modulators are configured so as to not change the polarization plane orientation of plane polarized light. In this second operational state, all of the plurality of optical channels received from the input are directed to the second polarizing port and no optical channels are directed to the third polarizing port.

DETAILED DESCRIPTION

The present invention provides an apparatus and system for a re-configurable optical channel dropping de-multiplexer. The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the present invention, the reader is referred to the appended FIGS. 1–6 in conjunction with the following description.

Figure 1A:
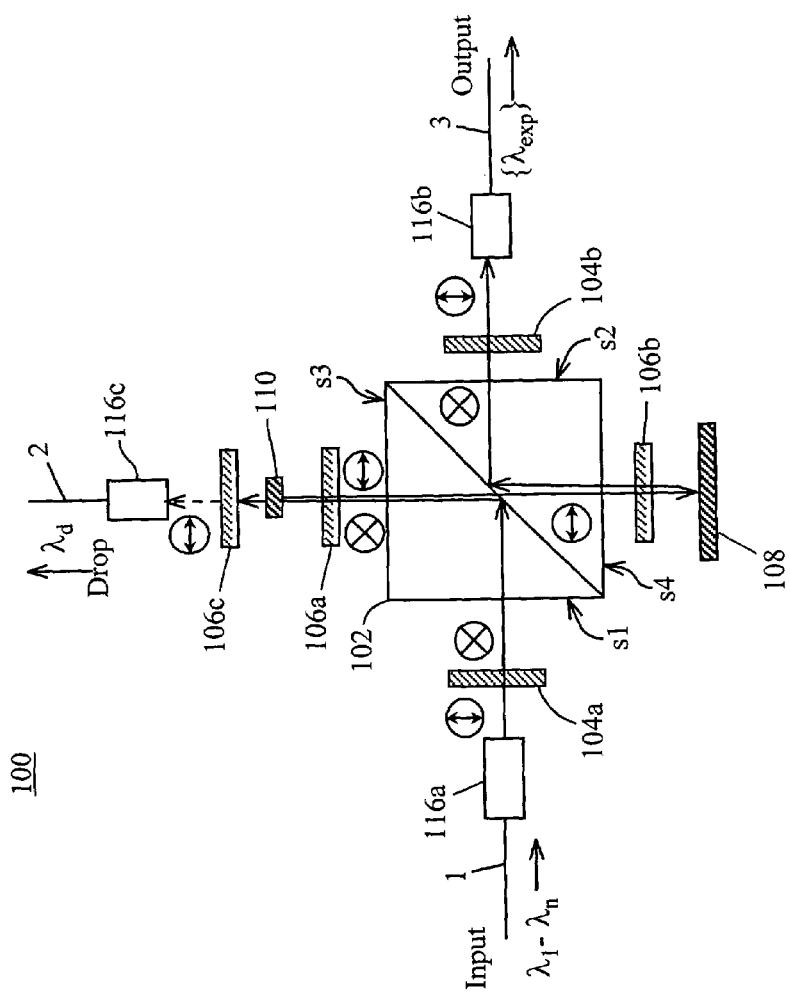
FIG. 1A is an illustration of a first preferred embodiment of re-configurable channel dropping de-multiplexer in accordance with the present invention showing the pathways of optical channels in a first operational state.
Figure 1B:
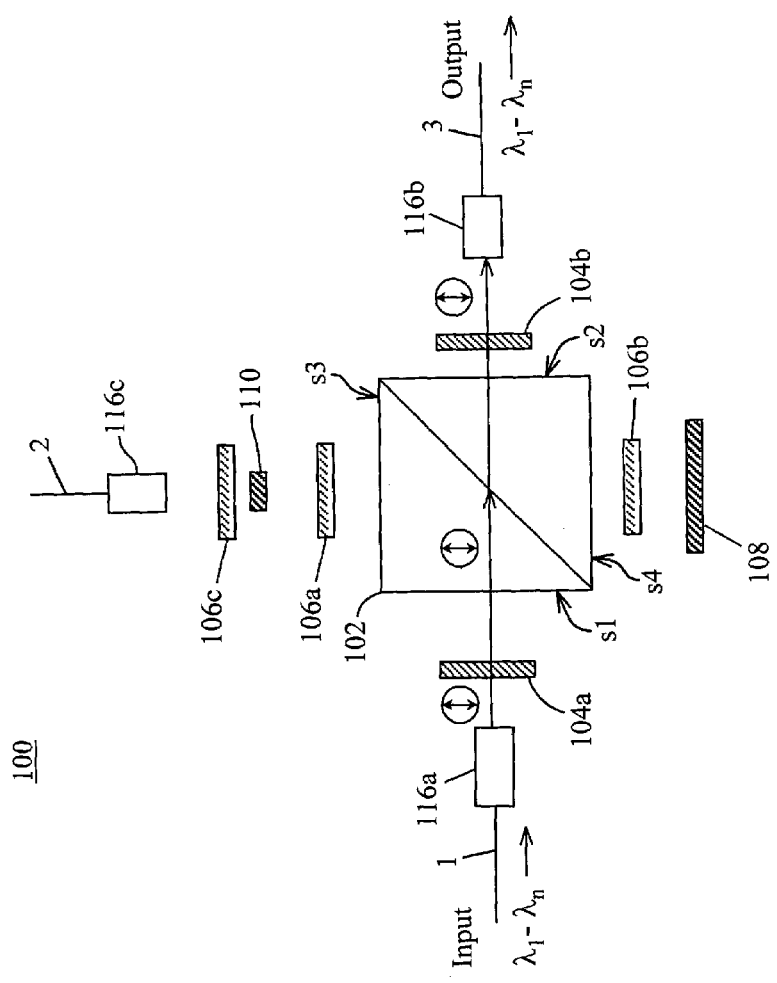
FIG. 1B is an illustration of the re-configurable channel dropping de-multiplexer of FIG. 1A, showing the pathways of optical channels in a second operational state.
Figure 1C:
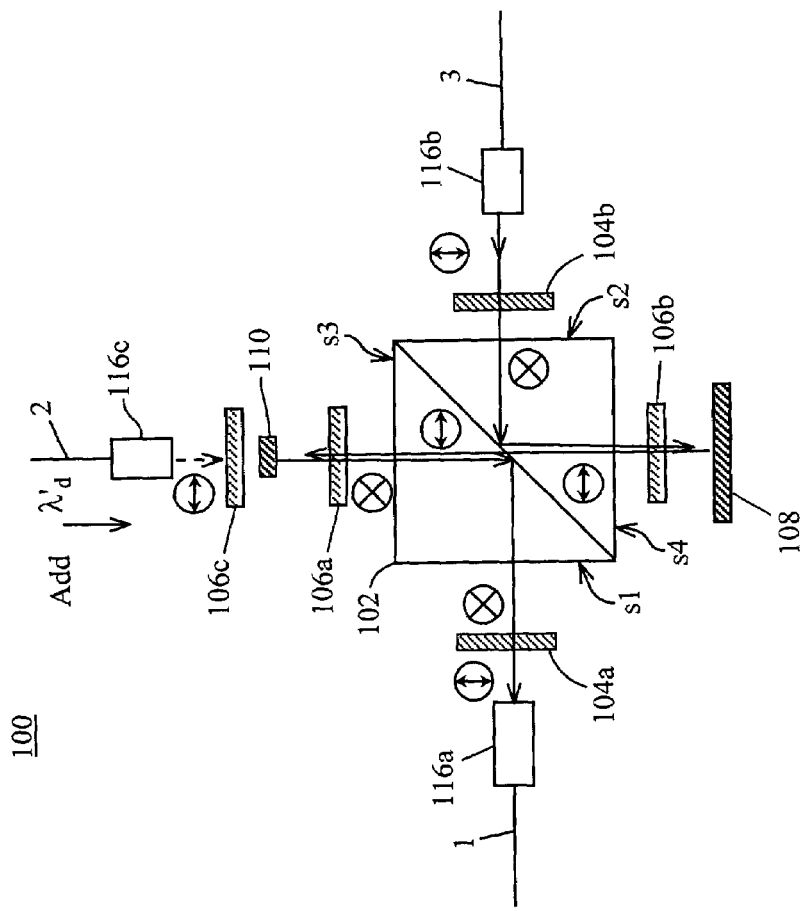
FIG. 1C is an illustration of the apparatus of FIG. 1A, showing the pathways of optical channels in an alternative channel adding operational state.

FIGS. 1A–1C illustrate a first preferred embodiment of a re-configurable channel dropping de-multiplexer in accordance with the present invention. The re-configurable channel dropping de-multiplexer 100 shown in FIGS. 1A–1C comprises an input 1, a first polarizing port 116a optically coupled to the input 1, a first polarization modulator 104a optically coupled to the first polarizing port 116a, a polarization beam splitter (PBS) 102 having a first side s1 that is optically coupled to the first polarization modulator 104a at a side opposite to the first polarizing port 116a, a second polarization modulator 104b optically coupled to the PBS 102 at a side s2 of the PBS 102 that is opposite to the side s1, a second polarizing port 116b optically coupled to the second polarization modulator 104b at a side opposite to the PBS 102 and a multiple-channel output 3 optically coupled to the second polarizing port 116b. Preferably, the PBS 102 is a well-known cube beamsplitter type as is illustrated in the figures. Each of the two polarization modulators 104a–104b is a component that either may or may not, in response to a control signal applied by the user thereto, rotate by 90 degrees the polarization plane orientation of plane-polarized light that passes therethrough. Preferably, each of the two polarization modulators 104a–104b comprises a well-known liquid crystal polarization modulator apparatus but may, alternatively, comprise any equivalent polarization modulation apparatus, such as an electro-optic device.

The re-configurable channel dropping de-multiplexer 100 (FIGS. 1A–1C) further comprises a first quarter-wave ($\lambda$/4) plate 106a optically coupled to the PBS at a third side s3 of the PBS 102 that is not parallel to the first side s1 or to the second side s2, a second $\lambda$/4 plate 106b optically coupled to the PBS at a side s4 of the PBS 102 that is opposite to the third side s3 and a mirror 108 optically coupled to the second $\lambda$/4 plate 106b at a side opposite to the PBS 102. The re-configurable channel dropping de-multiplexer 100 still further comprises an optical channel band pass filter 110 optically coupled to the first $\lambda$/4 plate 106a at a side opposite to the PBS 102, a third $\lambda$/4 plate 106c optically coupled to the optical channel band pass filter 110 at a side opposite to the first $\lambda$/4 plate 106a, a third polarizing port 116c optically coupled to the third $\lambda$/4 plate 106c at a side opposite to the optical channel band pass filter 110 and a single-channel output 2 optically coupled to the third polarizing port 116c. The optical band pass filter 110, which may comprise a well-known thin-film band pass filter, has a pass band that permits transmission therethrough of only one channel or wavelength of a multi-channel wavelength-division multiplexed optical signal. Other channels that are not transmitted through the band pass filter 110 are reflected at this band pass filter.

Figure 2A:
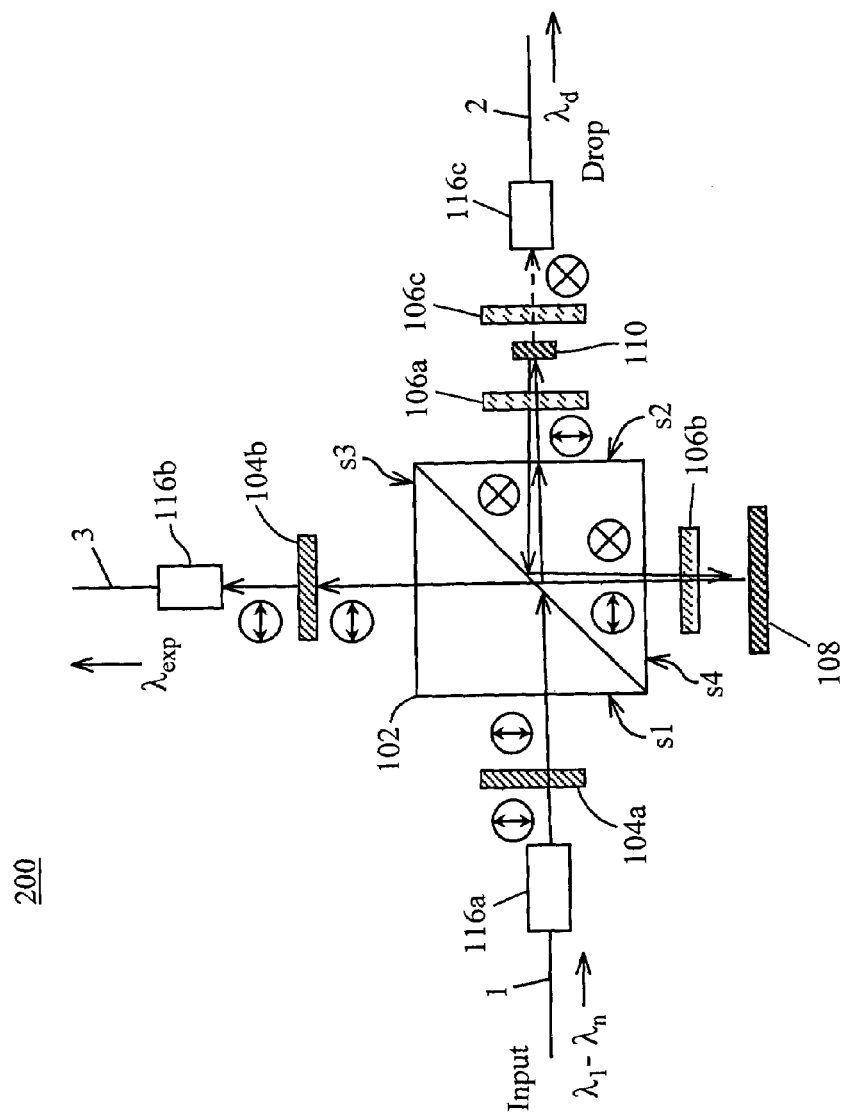
FIG. 2A is an illustration of a second preferred embodiment of re-configurable channel dropping de-multiplexer in accordance with the present invention showing the pathways of optical channels in a first operational state.
Figure 2B:
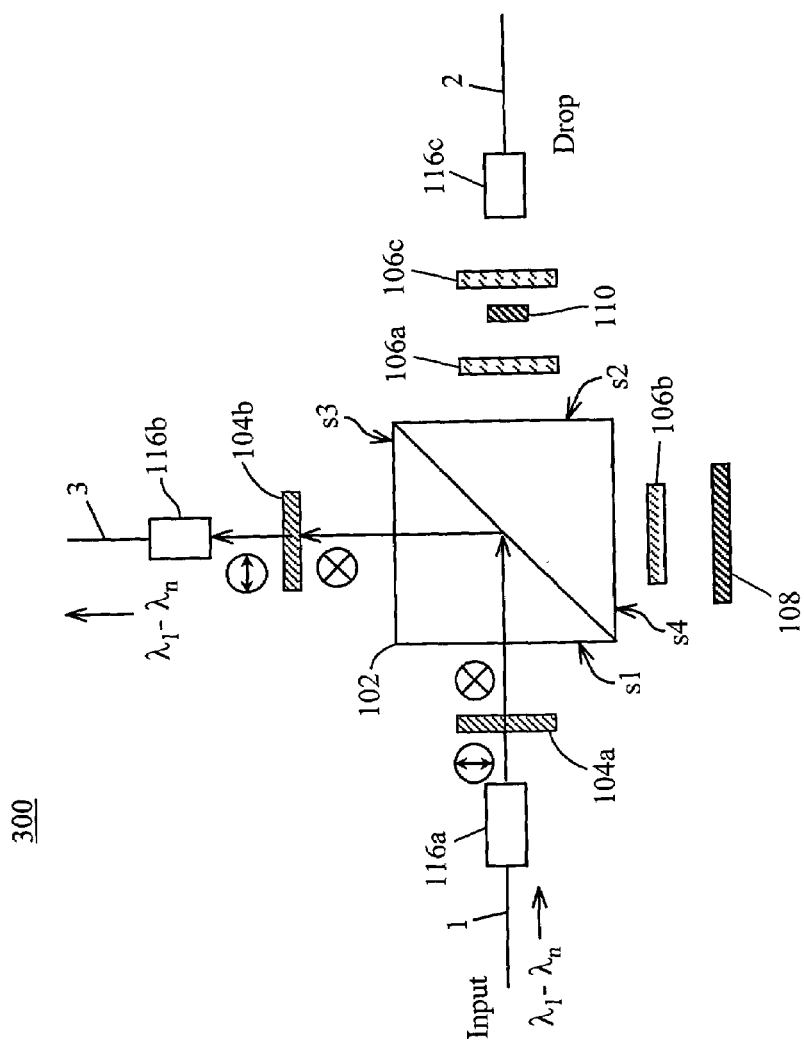
FIG. 2B is an illustration of the re-configurable channel dropping de-multiplexer of FIG. 2A, showing the pathways of optical channels in a second operational state.
Figure 3:
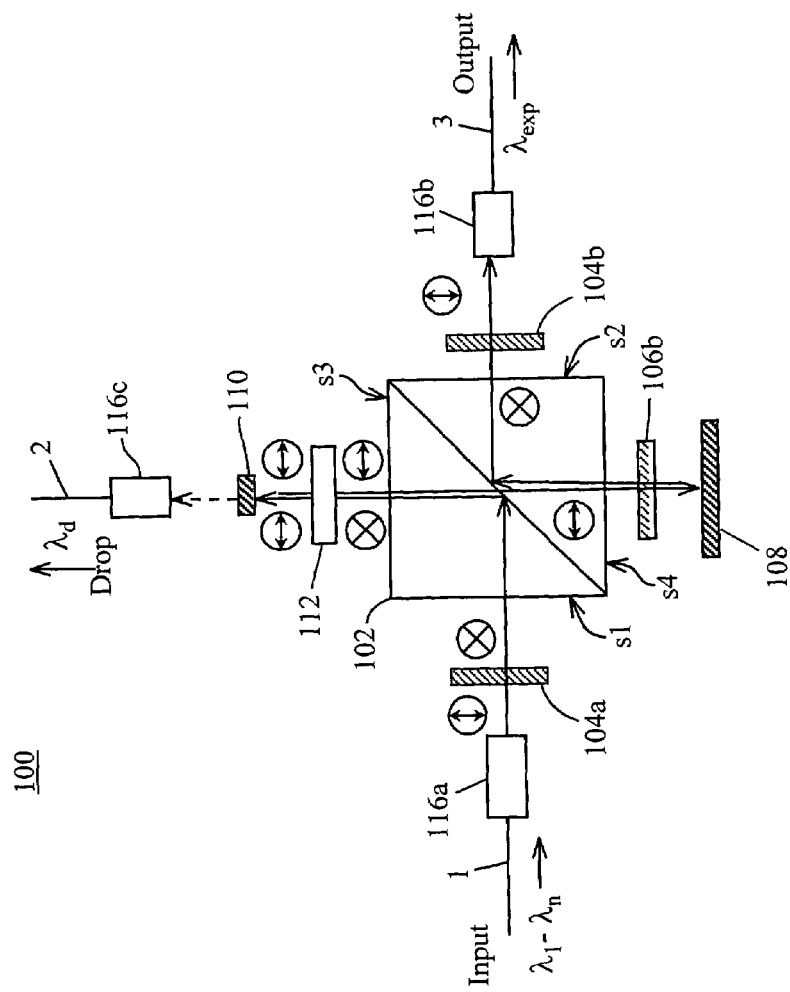
FIG. 3 is an illustration of a third preferred embodiment of re-configurable channel dropping de-multiplexer in accordance with the present invention.
Figure 4:
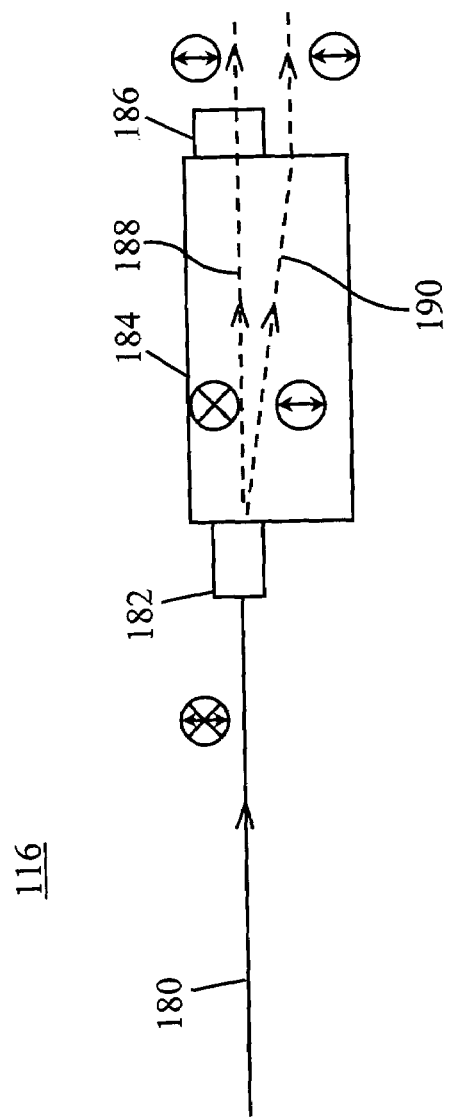
FIG. 4 is a detailed illustration of the structure of a polarizing optical port that may be utilized as either a polarizing input port or a polarizing output port within an embodiment of a re-configurable channel dropping de-multiplexer in accordance with the present invention.

To more fully describe the re-configurable channel dropping de-multiplexer 100, reference is now made to FIG. 4, which is a detailed illustration of the structure of a polarizing optical port that may be utilized as any one of the polarizing ports 116a–116c of FIGS. 1–3. The port 116 is herein termed a "polarizing port" because said port emanates light comprising only a single linear polarization orientation and can only receive light comprising the same linear polarization orientation. Unless otherwise specified, all references to "ports" within this disclosure are to be understood as referring to polarizing ports of the type illustrated in FIG. 4. The polarizing port 116 shown in FIG. 4 comprises an optical fiber 180, an optical collimator 182, a birefringent walk-off plate 184 and a reciprocal optical rotator 186. The optical collimator 182 is optically coupled to the optical fiber 180 and either receives input from or directs output to the fiber 180. When the optical fiber 180 is utilized to deliver input light, the polarizing port 116 is an input port and the collimator 182 receives diverging light rays and sets these rays parallel to one another so as to form a light beam. When the optical fiber 180 receives output light, the polarizing port 116 is an output port and the collimator 182 focuses a beam of collimated light into the end face of the fiber 180.

The birefringent walk-off plate 184 of the polarizing port 116 (FIG. 4) is optically coupled to the collimator 182 at a side opposite to the fiber 180 and has the property of physically separating an unpolarized light beam received from collimator 182 into a deflected light beam 190 and an un-deflected light beam 188. The deflected light 190 comprises an e-ray having a first linear polarization orientation and the un-deflected light 188 comprises an o-ray having a second linear polarization orientation perpendicular to that of the e-ray.

Immediately after passing through the birefringent walk-off plate 184 of the polarizing port 116 (FIG. 4), the two beams 188–190 emerge parallel to one another but have mutually orthogonal polarization orientations. The reciprocal optical rotator 186, which is optically coupled to the birefringent walk-off plate 184 at a side opposite to the collimator 182, is disposed so at to intercept the path of only one of the two beams 188–190. The reciprocal optical rotator 186 rotates the polarization orientation of said intercepted beam by 90° so as to be parallel to that of the other beam. In the reverse light propagation direction, that is, when the polarizing port 116 is utilized as an output port, the optical rotator 186 rotates the polarization orientation of only one of two beams so that said beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190. When the polarizing port 116 is used as an output port, the ray paths are reversed from those shown in FIG. 4.

Returning, now, to the discussion of FIG. 1A, there are shown the pathways of a plurality of optical channels $\lambda_1$–$\lambda_n$ through the re-configurable channel dropping de-multiplexer 100 from the first polarizing port 116a to both the second polarizing port 116b and the third polarizing port 116c such that a single dropped channel $\lambda_d$ is routed to the third polarizing port 116c and the remaining channels, termed the "express" channels and denoted as the set $\{\lambda_{exp}\}$ are routed to the second polarizing port 116b. FIG. 1B shows the pathways of the plurality of optical channels $\lambda_1$–$\lambda_n$ in an alternative operational state of the re-configurable channel dropping de-multiplexer 100 such that all the channels are routed to the second polarizing port 116b. FIG. 1C shows an alternative use of the re-configurable channel dropping de-multiplexer 100 as a re-configurable channel adding multiplexer through simple reversal of the propagation directions of all of the channels through the apparatus.

In operation of the re-configurable channel dropping de-multiplexer 100 (FIGS. 1A–1B), a light comprising a wavelength-division multiplexed optical signal comprising channels $\lambda_1$–$\lambda_n$ is input from the first polarizing port 116a as two separated beams, having similar linear polarization orientation. It is to be kept in mind, in reference to the following discussion of FIGS. 1–3, that each reference to a channel pathway or a light pathway through a re-configurable channel dropping filter actually includes these two separated beams, whose representations cannot be separately shown in FIGS. 1–3 because these representations overlap one another in projection. These two beams originate at a polarizing port utilized for input and are ultimately recombined at another polarizing port utilized for output. It is also to be noted that, even though all optical pathways through the PBS 102 are either "horizontal" or "vertical" with respect to the drawings and should, ideally, be shown as passing through the center of the representation of the PBS 102, some pathways are shown slightly offset from their correct positions or at a slight angle to their correct trajectory to prevent overlapping lines.

Also shown in FIG. 1A, as well as in other figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the drawing. Superimposed arrows and crosses either indicate non-polarized or randomly polarized light or pairs of rays that have mutually perpendicular polarization plane orientations and whose drawn representations are superimposed in projection view.

For purposes of this example, it is assumed, as indicated by the appropriate polarization-indicating symbols in FIGS. 1A–1C, that the light emanating from the first polarizing port 1116a is plane polarized parallel to the side of the drawing, that the second polarizing port 116b can only receive light that is, likewise, plane polarized parallel to the side of the drawing and that the third polarizing port 116c can only receive light that is plane polarized parallel to the top edge of the drawing. Any port that emanates light that is plane polarized in a certain orientation will also accept only a light component whose polarization is oriented in that same direction and vice versa. Light emanating from the first polarizing port 116a first encounters the first polarization modulator 104a as shown in FIGS. 1A–1B. This first polarization modulator 104a may be configured so as to leave the light polarization orientation unchanged, as is illustrated in FIG. 1B, or so as to rotate the polarization orientation by 90 degrees, as is illustrated in FIG. 1A and FIG. 1C.

In the mode of operation of the re-configurable channel dropping de-multiplexer 100 shown in FIG. 1B, both the first polarization modulator 104a and the second polarization modulator 104b are configured such the polarization plane orientation of light passing through either one of these polarization modulators does not change. Therefore, the light of the optical channels $\lambda_1$–$\lambda_n$ remains polarized parallel to the side of the drawing after passing through the first polarization modulator 104a. This light is p-polarized with respect to the PBS 102 and, as such, passes directly through the PBS 102, without deflection, to the second polarization modulator 104b. This same light of the optical channels $\lambda_1$–$\lambda_n$ passes through the second polarization modulator 104b to the second polarizing port 116b and remains plane polarized parallel to the side of the drawing. Since this is the polarization orientation that can be received by the second polarizing port 116b, the channels $\lambda_1$–$\lambda_n$ pass through this port and are output at multiple-channel output 3.

In the mode of operation of the re-configurable channel dropping de-multiplexer 100 illustrated in FIG. 1A, the polarization modulators 104a–104b are both configured so as to rotate the polarization orientation of light by 90 degrees. As a result, the light of the optical channels $\lambda_1$–$\lambda_n$ passing through the first polarization modulator 104a becomes polarized perpendicular to the plane of the drawing and, as such, is s-polarized with respect to the PBS 102. This s-polarized light of the optical channels $\lambda_1$–$\lambda_n$ is deflected by the PBS 102 so as to pass through the first $\lambda/4$ plate 106a, after which it become circularly polarized. This circularly polarized light then passes to the optical channel band pass filter 110.

Only the light of the channel $\lambda_d$ passes through the optical channel band pass filter 110 to the third $\lambda/4$ plate 106c; the remaining express channels, comprising the set $\{\lambda_{exp}\}$, are reflected at the optical channel band pass filter 110 back to the first $\lambda/4$ plate 106a (FIG. 1A). The passage of the channel $\lambda_d$ through the third $\lambda/4$ plate 106c causes the light comprising this channel to become plane polarized parallel to the lower edge of the drawing. Likewise, the passage of the express channels $\{\lambda_{exp}\}$ through the first $\lambda/4$ plate 106a (for a second time) causes the light comprising these channels to become plane polarized parallel to the lower edge of the drawing.

After passing through the third $\lambda/4$ plate 106c, the light of the channel $\lambda_d$ is plane polarized appropriately for the light to be received by the third polarizing port 116c. Therefore, the channel $\lambda_d$ passes through this port and is output at the single-channel output 2. Also, after passing through the first $\lambda/4$ plate 106a for a second time, the light of the express channels $\{\lambda_{exp}\}$ is plane polarized so as to comprise p-polarized light with respect to the PBS 102. Accordingly, these express channels pass directly through the PBS 102, without deflection and in a "downward" direction (according to the orientation of FIG. 1A) so as to pass through the second $\lambda/4$ plate 106b to the mirror 108. The express channels are reflected by the mirror 108 back to and through the second $\lambda/4$ plate 106b a second time. After reflection from the mirror 108 and two passes through the second $\lambda/4$ plate 106b, the light of the express channels becomes plane polarized perpendicularly to the plane of the drawing so as to comprise s-polarized light with respect to the PBS 102. Accordingly, this s-polarized light of the express channels $\{\lambda_{exp}\}$ is deflected by the PBS 102 towards the second polarization modulator 104b.

In the mode of operation of the re-configurable channel dropping de-multiplexer 100 shown in FIG. 1A, the second polarization modulator 104b is configured such that the polarization plane orientation of light passing through this polarization modulator is rotated by 90 degrees. Therefore, the light of the express channels $\{\lambda_{exp}\}$ passes through the second polarization modulator 104b and subsequently becomes plane polarized parallel to the side of the drawing as it enters the second polarizing port 116b. Since this is the polarization orientation that can be received by the second polarizing port 116b, the channels $\lambda_1$–$\lambda_n$ pass through this port and are output at the multiple-channel output 3.

FIG. 1C shows an alternative use of the apparatus 100 as a re-configurable channel adding multiplexer. The light pathways and polarization orientations shown in FIG. 1C are identical to those shown in FIG. 1A except that the pathways are exactly reversed from those shown in FIG. 1A. Accordingly, the express channels $\{\lambda_{exp}\}$ are input to the apparatus 100 at 3, the channel $\lambda_d$ is input to the apparatus at 2 and the combined channels $\lambda_1$–$\lambda_n$ exit from the apparatus at 1. Thus, in the multiplexing use illustrated in FIG. 1C, the express channels are combined together with the single-channel $\lambda_d$ such that the apparatus 100 functions as a channel adding multiplexer. As in the previously described de-multiplexing example (FIGS. 1A–1B), the apparatus 100, when used as a multiplexer (FIG. 1C), may be in either one of two different configurations or operational states. Thus the apparatus 100 is re-configurable in either de-multiplexing or multiplexing operations.

FIGS. 2A–2B illustrate a second preferred embodiment of a re-configurable channel dropping de-multiplexer in accordance with the present invention. The re-configurable channel dropping de-multiplexer 200 shown in FIGS. 2A–2B comprises an input 1, a first polarizing port 116a optically coupled to the input 1, a first polarization modulator 104a optically coupled to the first polarizing port 116a, a polarization beam splitter (PBS) 102 having a first side s1 that is optically coupled to the first polarization modulator 104a at a side opposite to the first polarizing port 116a, a second polarization modulator 104b optically coupled to the PBS 102 at a side s3 of the PBS 102 that is not parallel to the first side s1, a second polarizing port 116b optically coupled to the second polarization modulator 104b at a side opposite to the PBS 102 and a multiple-channel output 3 optically coupled to the second polarizing port 116b. The re-configurable channel dropping de-multiplexer 200 further comprises a first quarter-wave ($\lambda/4$) plate 106a optically coupled to the PBS 102 at a side s2 of the PBS 102 that is opposite to the first side s1, a second $\lambda/4$ plate 106b optically coupled to the PBS 102 at a side s4 of the PBS 102 opposite to the side s3 and a mirror 108 optically coupled to the second $\lambda/4$ plate 106b at a side opposite to the PBS 102. The re-configurable channel dropping de-multiplexer 100 still further comprises an optical channel band pass filter 110 optically coupled to the first $\lambda/4$ plate 106a at a side opposite to the PBS 102, a third $\lambda/4$ plate 106c optically coupled to the optical channel band pass filter 110 at a side opposite to the first $\lambda/4$ plate 106a, a third polarizing port 116c optically coupled to the third $\lambda/4$ plate 106c at a side opposite to the optical channel band pass filter 110 and a single-channel output 2 optically coupled to the third polarizing port 116c.

FIG. 2A shows the pathways of a plurality of optical channels $\lambda_1$–$\lambda_n$ through the re-configurable channel dropping de-multiplexer 200 from the first polarizing port 116a to both the second polarizing port 116b and the third polarizing port 116c such that a single dropped channel $\lambda_d$ is routed to the third polarizing port 116c and the remaining express channels are routed to the second polarizing port 116b. FIG. 2B shows the pathways of the plurality of optical channels $\lambda_1$–$\lambda_n$ in an alternative operational state of the re-configurable channel dropping de-multiplexer 200 such that all the channels are routed to the second polarizing port 116b. It is to be noted that, in the particular example discussed in relation to FIGS. 2A–2B, it is assumed, as indicated by the appropriate polarization-indicating symbols in FIGS. 2A–2B, that the light emanating from the first polarizing port 116a is plane polarized parallel to the side of the drawing, that the second polarizing port 116b can only receive light that is plane polarized parallel to the top edge of the drawing and that the third polarizing port 116c can only receive light that is plane polarized perpendicular to the plane of the drawing.

In the mode of operation of the re-configurable channel dropping de-multiplexer 200 shown in FIG. 2B, both the first polarization modulator 104a and the second polarization modulator 104b are configured such the polarization plane orientation of light passing through either one of these polarization modulators is rotated by 90 degrees. Therefore, the polarization plane orientation of light of the optical channels $\lambda_1$–$\lambda_n$ is rotated so as to be perpendicular to the plane of the drawing after passing through the first polarization modulator 104a. This light is s-polarized with respect to the PBS 102 and, as such, is deflected by the PBS 102 to the second polarization modulator 104b. The second polarization modulator 104b subsequently rotates the polarization plane orientation of this light so that is becomes plane polarized parallel to the top edge of the drawing. Since this is the polarization orientation that can be received by the second polarizing port 116b, the channels $\lambda_1$–$\lambda_n$ pass through this port and are output at the multiple-channel output 3.

In the mode of operation of the re-configurable channel dropping de-multiplexer 200 shown in FIG. 2A, both the first polarization modulator 104a and the second polarization modulator 104b are configured such that the polarization plane orientation of light passing through either one of these polarization modulators does not change. As a result, the light of the optical channels $\lambda_1$–$\lambda_n$ remains polarized parallel to the side of the drawing after passing through the first polarization modulator 104a. This light is p-polarized with respect to the PBS 102 and, as such, passes directly through the PBS 102, without deflection, to the first λ/4 plate 106a. The channels $\lambda_1$–$\lambda_n$ pass through the first λ/4 plate 106a to the optical channel band pass filter 110 at which they are separated into the dropped channel $\lambda_d$, which passes through the optical channel band pass filter 110 to the third λ/4 plate 106c and the set of express channels $\{\lambda_{exp}\}$ that are reflected back through the first λ/4 plate 106a to the PBS 102.

After having passed through both the first 106a and third 106c quarter-wave plates or through the first λ/4 plate 106a in both forward and reverse directions, the polarization plane orientation of either the light of the dropped channel $\lambda_d$ or the light of the express channels $\{\lambda_{exp}\}$ is rotated so as to become perpendicular to the plane of the drawing. Since this is the polarization orientation that can be received by the third polarizing port 116c, the channel $\lambda_d$ passes through this port and is output at the single-channel output 2. In regards to the express channels, the polarization plane orientation of the light of these channels (i.e., perpendicular to the plane of the drawing) comprises s-polarization with regard to the PBS 102 and, therefore, this light is deflected by the PBS 102 towards and through the second λ/4 plate 106b to the mirror 108. The express channels are then reflected by the mirror 108 back again through the second λ/4 plate 106b to the PBS 102. As discussed previously, the two passes, both forward and backward, of the express channels through the second λ/4 plate cause the polarization plane orientation of the light comprising these channels to be rotated so as to become polarized parallel to the lower (or top) edge of the drawing. This polarization plane orientation comprises p-polarization with regard to the PBS 102 and, as a result, this light is transmitted directly through the PBS 102, without deflection, to the second polarization modulator 104b. In the mode of operation shown in FIG. 2A, the second polarization modulator 104b is configured such the polarization plane orientation of light passing through this polarization modulator does not change. Therefore the light of the express channels remains plane polarized parallel to the lower (or top) edge of the drawing upon passing through the second polarization modulator 104b to the second polarizing port 116b. Since this is the polarization orientation that can be received by the second polarizing port 116b, the express channels $\{\lambda_{exp}\}$ pass through this port and are output at the multiple-channel output 3.

FIG. 3 provides an illustration of a third preferred embodiment of a re-configurable channel dropping de-multiplexer in accordance with the present invention. The re-configurable channel dropping de-multiplexer 300 shown in FIG. 3 is constructed and operates similarly to the re-configurable channel dropping de-multiplexer 100 (FIGS. 1A–1B) except that the first and third quarter-wave plates of the earlier described channel dropping de-multiplexer 100 are replaced by an isolator core 112, which isolator core is shown in greater detail in FIG. 6. The isolator core 112 functions such that plane polarized light passing completely therethrough in a first direction (e.g., from bottom-to-top according to the orientation shown in FIG. 3) incurs a 90 degree rotation of the orientation of its polarization plane whilst plane polarized light passing completely therethrough in the opposite direction (e.g., from top-to-bottom according to the orientation of FIG. 3) does not incur any polarization plane rotation.

The mode of operation of the re-configurable channel dropping de-multiplexer 300 shown in FIG. 3 is analogous to the mode of operation of the re-configurable channel dropping de-multiplexer 100 shown in FIG. 1A. The re-configurable channel dropping de-multiplexer 300 also has a second mode of operation (not specifically shown in FIG. 3) that is identical to that shown in FIG. 1B for the apparatus 100. In the mode of operation shown in FIG. 3, the light of the channels $\lambda_1$–$\lambda_n$ is polarized perpendicularly to the plane of the drawing after being deflected by the PBS 102 and just prior to entering the isolator core 112 of the re-configurable channel dropping de-multiplexer 300. Upon passing through the isolator core 112 from bottom-to-top towards the optical band pass filter 110, the polarization plane of the light of the channels $\lambda_1$–$\lambda_n$ becomes oriented parallel to the top edge of the drawing. The channels $\lambda_1$–$\lambda_n$ then proceed to the optical band pass filter 110, at which they are separated into a single dropped channel $\lambda_d$ that is transmitted through the filter 110 to the third polarizing port 116c and the remaining express channels $\{\lambda_{exp}\}$ that are reflected back to the isolator core 112.

Both the express channels $\{\lambda_{exp}\}$ and the dropped channel $\lambda_d$ remain plane polarized parallel to the top edge of the drawing after interacting with the filter 110 comprising the re-configurable channel dropping de-multiplexer 300 shown in FIG. 3. Since this is the polarization orientation that can be received by the third polarizing port 116c, the dropped channel $\lambda_d$ passes through this port and is output at the single-channel output 2. The express channels $\{\lambda_{exp}\}$ pass through the isolator core 112 back to the PBS 102 and, in so doing, maintain the same plane polarization parallel to the top edge of the drawing. Since this polarization comprises p-polarization with respect to the PBS 102, the express channels pass directly through the PBS 102, without deflection, to the second λ/4 plate 106b and, then, through the second λ/4 plate 106b to the mirror 108. Subsequently the pathways of the express channels through the re-configurable channel dropping de-multiplexer 300 are similar to those already described in relation to the re-configurable channel dropping de-multiplexer 100 (FIG. 1A).

Figure 6:
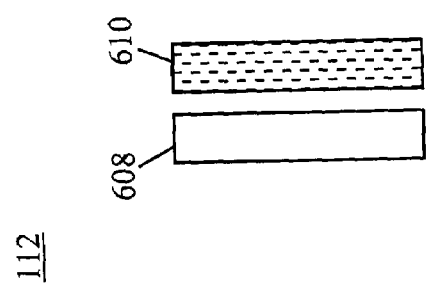
FIG. 6 is an illustration of an isolator core structure as may be utilized within the re-configurable channel dropping de-multiplexer of FIG. 3.
Figure 7:
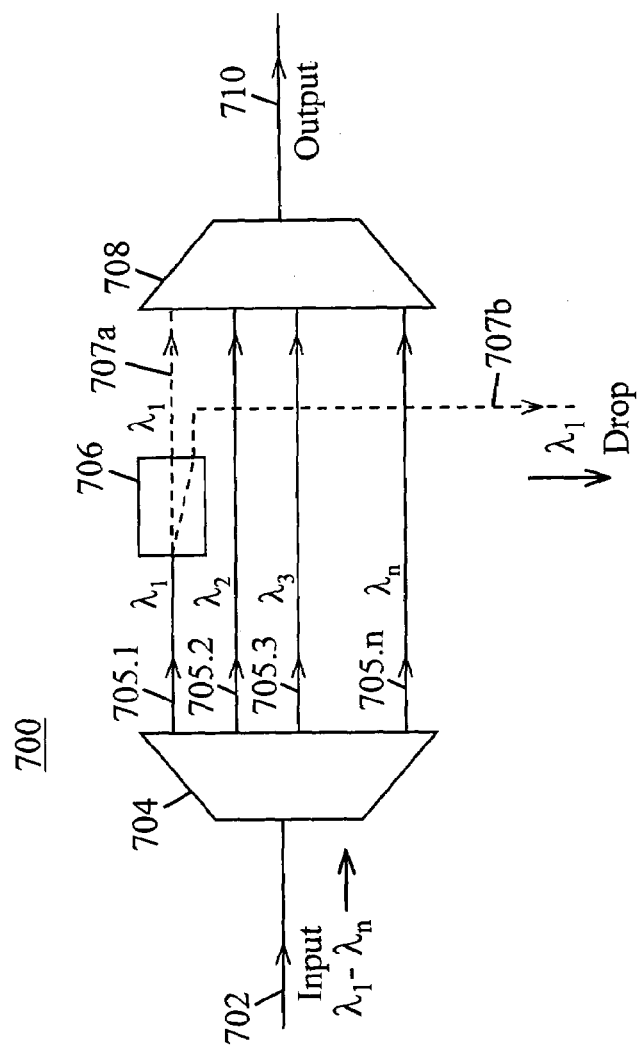
FIG. 7 is an illustration of a conventional re-configurable channel dropping de-multiplexer.

The term "isolator core" as used herein, refers to a component 1112, as shown in FIG. 6, that comprises a non-reciprocal optical polarization rotator 608 optically coupled to a reciprocal optical polarization rotator 610. The non-reciprocal optical polarization rotator 608 may comprise a well-known Faraday rotator or any optical component that functions equivalently to a Faraday rotator; the reciprocal optical polarization rotator 610 may comprise a half-wave plate or any other optical component that functions equivalently to a half-wave plate. This combination of optical polarization rotators, as shown in FIG. 6, is well-known in the art and is frequently used in the construction of optical circulators and isolators. It is well known that this combination of a reciprocal and non-reciprocal optical polarization rotator may be configured such that the polarization of linearly polarized light propagating through the isolator core in a forward direction, for instance, left to right, will be rotated by ninety degrees and whilst the polarization of linearly polarized light propagating through the isolator core in a reverse direction, for instance, right to left, will not be rotated.

Figure 5:
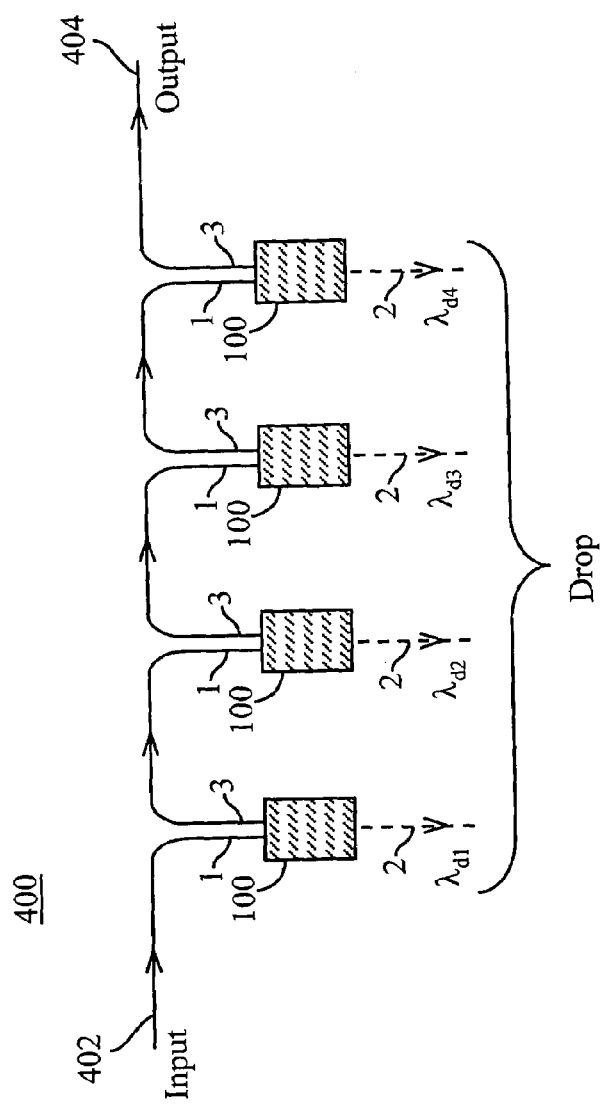
FIG. 5 is an illustration of a system for a re-configurable channel dropping de-multiplexer in accordance with the present invention.

FIG. 5 is an illustration of a system for a re-configurable channel dropping de-multiplexer in accordance with the present invention. The system 400 shown in FIG. 5 comprises a serial cascade arrangement in which a plurality of re-configurable channel dropping de-multiplexers—such as, for instance, the re-configurable channel dropping de-multiplexer 100 (FIGS. 1A–1B)—are sequentially optically coupled such that the input 1 of the first de-multiplexer 100 in the sequence is optically coupled to an input optical line 402, the multiple-channel output 3 of the last de-multiplexer 100 in the sequence is optically coupled to an output optical line 404 and the multiple-channel output 3 of each de-multiplexer 100 except for the last in the sequence is optically coupled to the input 1 of the subsequent de-multiplexer 100 in the sequence. The single-channel output 2 of each re-configurable channel dropping de-multiplexer 100 in the sequence comprising the system 400 may carry a different respective individual dropped channel. Each such dropped channel may be selected at each one of the re-configurable channel dropping de-multiplexers 100 comprising the system 400. The system 400 permits several selected channels to be removed or dropped from a composite optical signal received from the input optical line 402. Although the system 400 is illustrated using the re-configurable channel dropping de-multiplexer 100 as an example, each re-configurable channel dropping de-multiplexer of the system 400 may, alternatively, comprise the re-configurable channel dropping de-multiplexer 200 (FIGS. 2A–2B) or the re-configurable channel dropping de-multiplexer 300 (FIG. 3) or equivalent apparatus.

An improved apparatus and system for a re-configurable channel dropping de-multiplexer have been disclosed. Although the present invention has been disclosed in accordance with the embodiments shown, one of ordinary skill in the art will readily recognize that there could be variations to the embodiments shown and those variations would be within the spirit and scope of the present invention. Accordingly, many modifications may be made by one of ordinary skill in the art without departing from the scope of the invention, which is defined by the claims appended hereto.

We claim:

1. A re-configurable channel dropping de-multiplexer, comprising:
    an input;
    a first polarizing port optically coupled to the input;
    a first polarization modulator optically coupled to the first polarizing port;
    a polarization beam splitter (PBS) having a first side that is optically coupled to the first polarization modulator at a side opposite to the first polarizing port;
    a second polarization modulator optically coupled to the PBS at a second side of the PBS that is opposite to the first side;
    a second polarizing port optically coupled to the second polarization modulator at a side opposite to the PBS;
    a multiple-channel output optically coupled to the second polarizing port; and
    an isolator core optically coupled to the PBS at a third side of the PBS that is not parallel to either of the first two sides.

2. A cascaded re-configurable system having two or more re-configurable channel dropping de-multiplexers, comprising:
    a first re-configurable channel dropping de-multiplexer, comprising:
        an input for receiving a plurality of channels;
        a first polarizing port optically coupled to the input;
        a first polarization modulator optically coupled to the first polarizing port;
        a polarization beam splitter (PBS) having a first side that is optically coupled to the first polarization modulator at a side opposite to the first polarizing port;
        a second polarization modulator optically coupled to the PBS at a second side of the PBS that is opposite to the first side;
        a second polarizing port optically coupled to the second polarization modulator at a side opposite to the PBS; and
        a multiple-channel output optically coupled to the second polarizing port; and
    a second re-configurable channel dropping de-multiplexer, optically coupled to the first re-configurable channel dropping de-multiplexer, comprising:
        an input, coupled to the multiple-channel output of the first re-configurable channel dropping de-multiplexer;
        a first polarizing port optically coupled to the input;
        a first polarization modulator optically coupled to the first polarizing port;
        a polarization beam splitter (PBS) having a first side that is optically coupled to the first polarization modulator at a side opposite to the first polarizing port;
        a second polarization modulator optically coupled to the PBS at a second side of the PBS that is opposite to the first side;
        a second polarizing port optically coupled to the second polarization modulator at a side opposite to the PBS; and
        a multiple-channel output optically coupled to the second polarizing port, wherein each re-configurable channel dropping de-multiplexer further comprises a first quarter-wave ($\lambda/4$) plate optically coupled to the PBS at a side of the PBS that is not parallel to either of the first two sides.

3. A re-configurable channel dropping de-multiplexer, comprising:
    an input;
    a first polarizing port optically coupled to the input;
    a first polarization modulator optically coupled to the first polarizing port;
    a polarization beam splitter (PBS) having a first side that is optically coupled to the first polarization modulator at a side opposite to the first polarizing port;
    a second polarization modulator optically coupled to the PBS at a second side of the PBS that is opposite to the first side;

a second polarizing port optically coupled to the second polarization modulator at a side opposite to the PBS;
a multiple-channel output optically coupled to the second polarizing port; and
a first quarter-wave (λ/4) plate optically coupled to the PBS at a third side of the PBS that is not parallel to either of the first two sides.

4. The de-multiplexer of claim 3, further comprising a second λ/4 plate optically coupled to the PBS at a fourth side of the PBS that is opposite to the third side and a mirror optically coupled to the second λ/4 plate at a side opposite to the PBS.

5. The de-multiplexer of claim 4, further comprising an optical channel band pass filter optically coupled to the first λ/4 plate at a side opposite to the PBS.

6. The de-multiplexer of claim 5, further comprising a third λ/4 plate optically coupled to the optical channel band pass filter at a side opposite to the first λ/4 plate.

7. The de-multiplexer of claim 6, further comprising:
a third polarizing port optically coupled to the third λ/4 plate at a side opposite to the optical channel band pass filter; and
a single-channel output optically coupled to the third polarizing port.

8. The de-multiplexer of claim 7 functioning in a first operational state, wherein the first and the second polarization modulators are configured so as to rotate the orientation of plane polarized light by 90 degrees; and wherein the input receives and directs a plurality of optical channels to both the second polarizing port and the third polarizing port such that a single dropped channel is routed to the third polarizing port and such that one or more remaining express channels are routed to the second polarizing port.

9. The de-multiplexer of claim 7 functioning in a second operational state, wherein the first and the second polarization modulators are configured so as to not change the polarization plane orientation of plane polarized light; and wherein the input receives and directs a plurality of optical channels to the second polarizing port and no optical channels are directed to the third polarizing port.

10. The de-multiplexer of claim 3, further comprising an isolator core optically coupled to the PBS at a side of the PBS that is not parallel to either of the first two sides.

11. The de-multiplexer of claim 5, wherein the optical channel band pass filter comprises a thin film band pass filter.

12. The de-multiplexer of claim 6, operating as a channel adding multiplexer, wherein the multiple-channel output serves as a multiple-channel input for receiving a plurality of express channels, the single-channel output serves as a single-channel input, the input serves as an output, and the multiple-channel input is combined with the single-channel input to the output.

13. A re-configurable channel dropping de-multiplexer, comprising:
an input;
a first polarizing port optically coupled to the input;
a first polarization modulator optically coupled to the first polarizing port;
a polarization beam splitter having a first side s1 that is optically coupled to the first polarization modulator at a side opposite to the first polarizing port;
a second polarization modulator optically coupled to the PBS at a side s3 of the PBS that is not parallel to the first side s1;
a second polarizing port optically coupled to the second polarization modulator at a side opposite to the PBS;
a multiple-channel output optically coupled to the second polarizing port; and
a first quarter-wave (λ/4) plate optically coupled to the PBS at a side s2 of the PBS that is opposite to the first side s1.

14. The de-multiplexer of claim 13, further comprising:
a second λ/4 plate optically coupled to the PBS at a side s4 of the PBS opposite to the side s3; and
a mirror optically coupled to the second λ/4 plate at a side opposite to the PBS.

15. The de-multiplexer of claim 14, further comprising:
an optical channel band pass filter optically coupled to the first λ/4 plate at a side opposite to the PBS;
a third λ/4 plate optically coupled to the optical channel band pass filter at a side opposite to the first λ/4 plate;
a third polarizing port optically coupled to the third λ/4 plate at a side opposite to the optical channel band pass filter; and
a single-channel output optically coupled to the third polarizing port.

16. The de-multiplexer of claim 15 operating in a first state, further comprising a plurality of optical channels $\lambda_1-\lambda_n$ passing through the re-configurable channel dropping de-multiplexer from the first polarizing port to both the second polarizing port and the third polarizing port such that a single dropped channel $\lambda_d$ is routed to the third polarizing port and one or more remaining express channels are routed to the second polarizing port.

17. The de-multiplexer of claim 15 operating in a second state, further comprising a plurality of optical channels $\lambda_1-\lambda_n$ passing through the re-configurable channel dropping de-multiplexer wherein all the channels are routed to the second polarizing port.

18. The cascaded re-configurable system of claim 2, wherein each re-configurable channel dropping de-multiplexer further comprises an isolator core optically coupled to the PBS at a side of the PBS that is not parallel to either of the first two sides.

* * * * *